United States Patent
Zhu et al.

(10) Patent No.: US 10,341,014 B2
(45) Date of Patent: Jul. 2, 2019

(54) HYBRID BEAMFORMING MULTI-ANTENNA WIRELESS SYSTEMS

(71) Applicant: Ping Liang, Newport Coast, CA (US)

(72) Inventors: Dengkui Zhu, Wanyuan (CN); Boyu Li, Irvine, CA (US); Ping Liang, Newport Coast, CA (US)

(73) Assignee: RF DSP INC., Irvine, CA (US)

( * ) Notice: Subject to any disclaimer, the term of this patent is extended or adjusted under 35 U.S.C. 154(b) by 10 days.

(21) Appl. No.: 15/565,679

(22) PCT Filed: Apr. 12, 2016

(86) PCT No.: PCT/US2016/027007
§ 371 (c)(1),
(2) Date: Oct. 10, 2017

(87) PCT Pub. No.: WO2016/168128
PCT Pub. Date: Oct. 20, 2016

(65) Prior Publication Data
US 2018/0076881 A1    Mar. 15, 2018

Related U.S. Application Data

(60) Provisional application No. 62/148,089, filed on Apr. 15, 2015.

(51) Int. Cl.
*H04B 7/204* (2006.01)
*H04B 7/0426* (2017.01)
(Continued)

(52) U.S. Cl.
CPC .............. *H04B 7/204* (2013.01); *H04B 7/043* (2013.01); *H04B 7/0434* (2013.01); *H04B 7/0452* (2013.01); *H04L 5/22* (2013.01)

(58) Field of Classification Search
None
See application file for complete search history.

(56) References Cited

U.S. PATENT DOCUMENTS

2003/0142018 A1* 7/2003 Lange .................... H01Q 1/007
    343/700 MS
2007/0180345 A1* 8/2007 Ismail ................ H03M 13/1148
    714/752

(Continued)

OTHER PUBLICATIONS

PCT/US16/27007 Search Report and Written Opinion, dated Aug. 11, 2016.

*Primary Examiner* — Andrew C Oh
(74) *Attorney, Agent, or Firm* — Guosheng Wang; United States Research and Patent Firm (57) ABSTRACT

This invention presents methods for MU-MIMO wireless communication systems comprising a BS with plural of antennas placed as a linear array or planar array, plural of UEs, for conducting two-level signal processing at the BS to reduce the system implementation complexity, i.e., the RF precoding/combination and the baseband precoding/detection, for the BS to obtain the second-order statistical information of the channel matrix of each UE to computing the RF precoding matrix through a much smaller number of pilots than that of the transceiving antennas at the BS, where the second-order statistical information of the channel matrix can be obtained through the uplink reference signals or downlink reference signals plus uplink feedback.

39 Claims, 5 Drawing Sheets

(51) Int. Cl.
*H04B 7/0452* (2017.01)
*H04L 5/22* (2006.01)

(56) References Cited

U.S. PATENT DOCUMENTS

| | | | | |
|---|---|---|---|---|
| 2007/0211823 A1* | 9/2007 | Mazzarese | H04B 7/0452 | 375/299 |
| 2008/0212701 A1* | 9/2008 | Pan | H04B 7/0417 | 375/260 |
| 2009/0303952 A1* | 12/2009 | Hosokawa | H04W 72/085 | 370/329 |
| 2011/0134859 A1* | 6/2011 | Li | H04B 7/0452 | 370/329 |
| 2011/0134902 A1* | 6/2011 | Ko | H04B 7/0434 | 370/344 |
| 2011/0199968 A1* | 8/2011 | Kim | H04B 7/0617 | 370/328 |
| 2011/0249712 A1* | 10/2011 | Hammarwall | H04B 7/0634 | 375/220 |
| 2012/0045995 A1* | 2/2012 | Nakano | H04J 11/0036 | 455/63.1 |
| 2013/0163457 A1* | 6/2013 | Kim | H04W 24/02 | 370/252 |
| 2013/0315328 A1* | 11/2013 | Liu | H04B 7/0413 | 375/267 |
| 2013/0336282 A1* | 12/2013 | Nakano | H04B 7/0456 | 370/330 |
| 2014/0044044 A1* | 2/2014 | Josiam | H04W 24/10 | 370/328 |
| 2014/0050280 A1* | 2/2014 | Stirling-Gallacher | H04B 7/0486 | 375/296 |
| 2014/0056381 A1* | 2/2014 | Wang | H04B 7/0617 | 375/295 |
| 2014/0079165 A1 | 3/2014 | Kludt et al. | | |
| 2014/0093005 A1* | 4/2014 | Xia | H04B 7/0617 | 375/267 |
| 2014/0169430 A1 | 6/2014 | Nilson et al. | | |
| 2014/0179334 A1* | 6/2014 | Forenza | H04B 7/024 | 455/452.2 |
| 2014/0225776 A1 | 8/2014 | Harel et al. | | |
| 2014/0269492 A1* | 9/2014 | Forenza | H04B 7/0626 | 370/328 |
| 2014/0370826 A1* | 12/2014 | Amini | H04B 1/44 | 455/78 |
| 2015/0049826 A1* | 2/2015 | Liu | H04B 7/0617 | 375/267 |
| 2015/0173024 A1* | 6/2015 | Seo | H04W 52/146 | 370/329 |
| 2015/0229371 A1* | 8/2015 | Kim | H04B 7/0469 | 375/267 |
| 2015/0229414 A1* | 8/2015 | Chae | H04W 52/0209 | 455/78 |
| 2015/0236774 A1* | 8/2015 | Son | H04B 7/0628 | 375/267 |
| 2015/0282185 A1* | 10/2015 | Nikopour | H04L 1/0002 | 370/329 |
| 2015/0288439 A1* | 10/2015 | Kim | H04B 7/0469 | 375/295 |
| 2015/0365153 A1* | 12/2015 | Kim | H04B 7/0417 | 370/329 |
| 2015/0373736 A1* | 12/2015 | Ji | H04B 7/2621 | 370/330 |
| 2015/0381252 A1* | 12/2015 | Kang | H04B 7/024 | 370/329 |
| 2016/0020837 A1* | 1/2016 | Schober | H04B 7/0469 | 375/267 |
| 2016/0020933 A1* | 1/2016 | Rajagopal | H04L 27/0006 | 370/329 |
| 2016/0094284 A1* | 3/2016 | Yum | H04B 7/0456 | 375/267 |
| 2016/0119038 A1* | 4/2016 | Thomas | H04B 7/043 | 370/329 |
| 2016/0241323 A1* | 8/2016 | Ko | H04B 7/0691 | |
| 2016/0344531 A1* | 11/2016 | Li | H04L 5/0037 | |
| 2017/0033852 A1* | 2/2017 | Kim | H04B 7/0456 | |
| 2017/0033853 A1* | 2/2017 | Kim | H04B 7/0417 | |
| 2017/0134105 A1* | 5/2017 | Miao | H04B 7/0617 | |
| 2017/0141826 A1* | 5/2017 | Kim | H04B 7/0486 | |
| 2017/0149479 A1* | 5/2017 | Kim | H04L 1/06 | |
| 2017/0163325 A1* | 6/2017 | Kang | H04B 7/0617 | |
| 2017/0201309 A1* | 7/2017 | Kang | H04B 7/0478 | |
| 2017/0222703 A1* | 8/2017 | Thomas | H04B 7/0617 | |
| 2017/0244513 A1* | 8/2017 | Pitakdumrongkija | H04B 7/0452 | |
| 2017/0338876 A1* | 11/2017 | Moosavi | H04B 7/0456 | |
| 2018/0013473 A1* | 1/2018 | Tosato | H04B 7/0465 | |
| 2018/0076881 A1* | 3/2018 | Zhu | H04B 7/204 | |
| 2018/0138592 A1* | 5/2018 | Derneryd | H01Q 3/40 | |

\* cited by examiner

HYBRID BEAMFORMING MULTI-ANTENNA WIRELESS SYSTEMS

This application claims the benefit of U.S. Provisional Application No. 62/148,089, filed on Apr. 15, 2015.

FIELD OF INVENTION

The field of this patent is the multi-antenna wireless communication systems.

This invention relates generally to Multiple-Input Multiple-Output (MIMO) wireless communication networks or systems, and more particularly, a novel method to calculate the analog beamforming matrix and the baseband precoding/detection matrix based on the partially measured Channel State Information (CSI) as well as the apparatus and systems to implement this method.

BACKGROUND

Massive Multiple-Input Multiple-Output (MIMO) or large-scale MIMO systems were firstly introduced in [1] in which each Base Station (BS) is equipped with dozens to hundreds of antennas to serve tens of users simultaneously through Multi-User MIMO (MU-MIMO) in the same time-frequency resource. Therefore, they can achieve significantly higher spatial multiplexing gains than conventional MU-MIMO systems by linear beamforming methods, e.g., Zero-Forcing (ZF) which can achieve performance very close to the channel capacity, and have drawn great interest from both academia and industry [1]-[3]. Moreover, massive MIMO is viewed as one of the most promising techniques for the 5th Generation (5G) wireless communication systems and has been included in the latest 3rd Generation Partnership Project (3GPP) Long Term Evolution (LTE) standard release 13 [4], where it is termed as Full Dimension (FD) MIMO.

Figure 1:
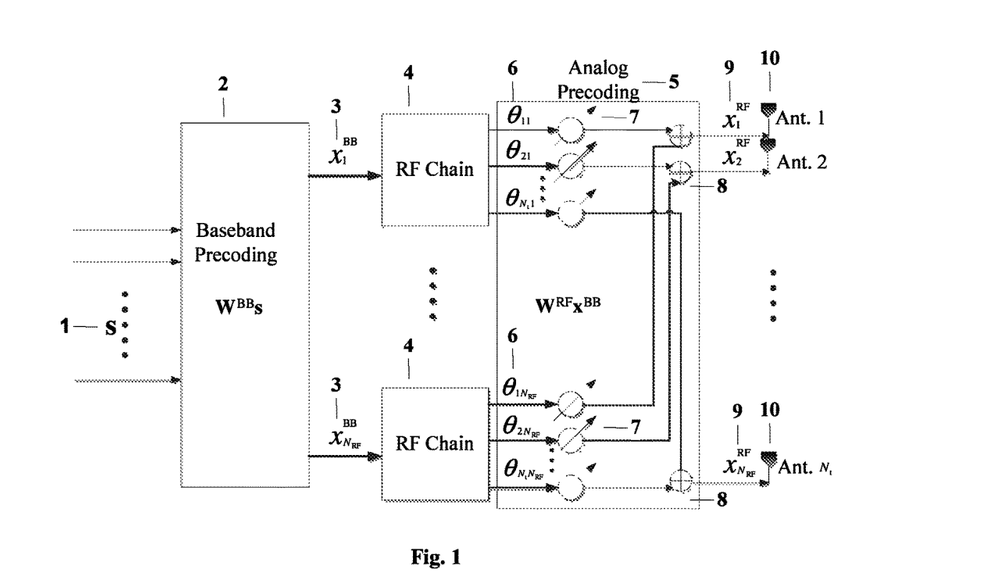
FIG. 1 shows the transmitter architecture of a BS with global analog precoding.
Figure 2:
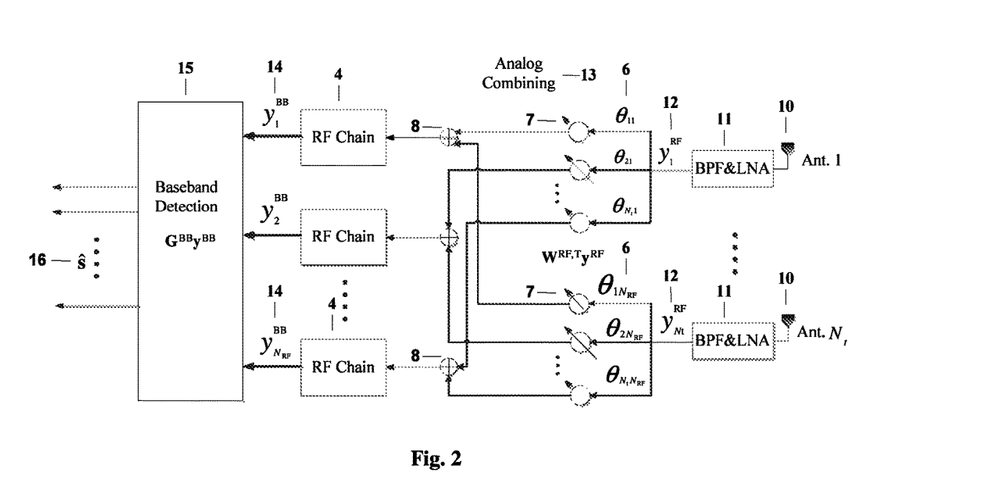
FIG. 2 shows the receiver architecture of a BS with global analog combining.

Despite of the advantages, there still exist very tough challenges for applying massive MIMO to practical systems. To exploit the gains of large-scale antenna arrays, take the downlink as an example, the signals of all the antennas are firstly processed at the baseband, e.g., channel estimation, precoding, etc., then up-converted to the carrier frequency after passing through digital-to-analog (D/A) converters, mixers, and power amplifiers, i.e., Radio Frequency (RF) chains. Outputs of the RF chains are then coupled with the antenna elements. As a result, it introduces huge baseband computation complexity, e.g., $O(N_tK^2)$, for ZF precoding per precoding unit in the downlink, where $N_t$ and K are the numbers of antennas at the BS and the number of users per MU-MIMO group respectively. Moreover, each antenna element needs a dedicated RF chain, increasing the implementation cost substantially when $N_t$ is very large and requiring high power consumption of mixed signal components, which might result in impractically high complexity for digital baseband precoding. On the other hand, cost-effective variable phase shifters are readily available with current circuit technologies, which enable the possibility to apply high dimensional phase-only RF or analog processing [5], [6]. Due to these reasons, Hybrid Beamforming (HB) [7], [8], was proposed and considered as the promising solution to address this problem in practical systems, e.g., the latest LTE Release 13 [4], in which the global beamforming is decomposed into baseband digital precoding/detection and RF analog precoding/combining respectively so that the signal dimension at the baseband, i.e., the number of RF chains, is reduced to a much smaller number than that of the physical antennas. The analog precoding/combining is also called antenna virtualization [4]. The architecture of the BS transmitter with HB is shown in FIG. 1. Specifically, the K×1 baseband transmitted data vector s 1 is first processed by the first-level digital baseband precoding 2, i.e., $x^{BB}=W^{BB}s$, where $W^{BB}$ is the $N_{RF} \times K$ digital baseband precoding matrix with $N_{RF}$ being the number of RF chains, and $x^{BB}$ is the $N_{RF} \times 1$ baseband precoded transmitted symbol vector with $x_i^{BB}$ 3, $i=1,\ldots,N_{RF}$, being the ith element in $x^{BB}$. Then, after $x^{BB}$ is passed through these $N_{RF}$ RF chains 4, a second-level RF analog precoding 5 is applied, i.e., $x^{RF}=W^{RF}x^{BB}$, where $W^{RF}$ is the $N_t \times N_{RF}$ RF analog precoding matrix with $\theta_{ji}$ 6, $i=1,\ldots,N_{RF}$, $j=1,\ldots,N_t$, being the $\{j,i\}$th element in $W^{RF}$, which is generally realized in practice by a phase-shift network consisted of phase shifters 7 and summers 8, and $x^{RF}$ is the $N_t \times 1$ transmitted RF symbol vector with $x_j^{RF}$ 9, $j=1,\ldots,N_t$, being the jth element in $x^{RF}$. Finally, $x^{RF}$ is transmitted by the $N_t$ antennas 10. Similarly, the architecture of the BS receiver with HB is shown in FIG. 2. Specifically, let the $N_r \times 1$ RF symbol vector received by the $N_r$ antennas and after the Bandpass Filters (BPF) and Low-Noise Amplifiers (LNA) 11, be $y^{RF}$ with $y_j^{RF}$ 12, $j=1,\ldots,N_r$, being the jth element in $y^{RF}$. First, $y^{RF}$ is processed by the first-level RF analog combining 13, i.e., $y^{BB}=W^{RF,T}y^{RF}$, where $W^{RF}$ is the $N_r \times N_{RF}$ RF analog combining matrix as in FIG. 1 and $y^{BB}$ is the $N_{RF} \times 1$ baseband symbol vector received by the $N_{RF}$ RF chains with $y_i^{BB}$ 14, $i=1,\ldots,N_{RF}$, being the ith element in $y^{BB}$. Then, the digital baseband detection 15 is applied, i.e., $\hat{s}=G^{BB}y^{BB}$, where $G^{BB}$ is the $K \times N_{RF}$ digital baseband detection matrix, and $\hat{s}$ 16 is the K×1 baseband detected symbol vector. Other than the conventional micro-wave commercial communication systems, HB also has been considered as the most promising beamforming method for millimeter Wave (mm-Wave) communication systems with large-scale antenna arrays [7], [8].

The prior three HB methods were proposed in [9]-[11] for the downlink transmission. In [9], the beam space or mask of the channel vector of each user is computed first based on full CSI, i.e., several vectors in the Discrete Fourier Transformation (DFT) matrix. The analog precoding matrix of a MU-MIMO group is consisted of the beam spaces of all the K users. In [10], an iterative HB method for Single-User MIMO (SU-MIMO) with partial CSI is derived. In [11], the phase component of the MU-MIMO channel matrix is used as the analog precoding matrix. However, all of these methods face at least one of the two following problems:
1) The full CSI, i.e., the channel coefficient of each antenna, is assumed to be available at the baseband to compute the analog precoding matrix, which is impractical for practical systems with limited number of RF chains. If the CSI is measured by users transmitting uplink Sounding Reference Signals (SRSs), however, due to the limited number of RF chains in HB systems, the full CSI is unavailable. If the CSI is measured by downlink CSI-RS, the pilot overhead is substantially huge because of the large number of antennas. Moreover, the measured CSI has to be quantized before feeding back to the BS. Hence, full CSI is unavailable for practical systems.
2) The analog precoding matrix is derived based on the CSI of users in a single MU-MIMO group. However, for practical OFDM-based systems, e.g., LTE/LTE-A, as multiple MU-MIMO groups are scheduled in one OFDM symbol, these algorithms suffer large performance loss as they are only suited for a single MU-MIMO group.

For these reasons, this patent provides HB methods and apparatus designed to overcome these shortcomings of prior arts. The proposed methods construct a subspace for each user firstly based on the principal angle information contained in the partial CSI. Then, the unified analog beamforming matrix is derived with the subspaces of all the users in the system. Finally, the base band beamforming is employed.

BRIEF DESCRIPTION OF DRAWINGS

The aforementioned implementation of the invention as well as additional implementations would be more clearly understood as a result of the following detailed description of the various aspects of the invention when taken in conjunction with the drawings. Like reference numerals refer to corresponding parts throughout the several views of the drawings.

DETAILED DESCRIPTION

Reference may now be made to the drawings wherein like numerals refer to like parts throughout. Exemplary embodiments of the invention may now be described. The exemplary embodiments are provided to illustrate aspects of the invention and should not be construed as limiting the scope of the invention. When the exemplary embodiments are described with reference to block diagrams or flowcharts, each block may represent a method step or an apparatus element for performing the method step. Depending upon the implementation, the corresponding apparatus element may be configured in hardware, software, firmware or combinations thereof. Hereafter, a pilot signal may mean a signal transmitted by one antenna for the purpose of estimating the channel between the transmitting antenna and one or more receiving antennas. It may also be called a reference signal, a channel estimation signal or a test signal.

Consider a MU-MIMO wireless communication system, where the BS has $N_t$ antennas for transmitting and receiving. Assuming all the User Equipments (UEs) needed to be served in the next period of time consist of a set $\Phi$, where the cardinality of $\Phi$ is $N_{ue}=|\Phi|$. For systems based on Orthogonal Frequency Division Multiplexing (OFDM), K single-antenna UEs are multiplexed on the same time-frequency resource through MU-MIMO technology, where the time-frequency resource is organized as multiple consecutive OFDM symbols in the time domain by multiple subcarriers in the frequency domain, e.g., one to several Resource Blocks (RBs) in LTE/LTE-A systems. Although the descriptions in this patent focus on the single-antenna UE case, they can be directly generalized to the multi-antenna UE case. Let $N_{RF}$ denote the number of RF chains at the BS, considering a Resource Element (RE), i.e., an OFDM symbol in the time domain at a single subcarrier in the frequency domain, for the downlink transmission, the MU-MIMO precoding can be written as $$x^{RF}=Ws=W_{dl}^{RF}x^{BB}=W_{dl}^{RF}W^{BB}s, \qquad (1.1)$$

where W is the effective global precoding matrix with dimension $N_t \times K$, $W_{dl}^{RF}$ is the analog precoding matrix at the RF with dimension $N_t \times N_{RF}$, $W^{BB}$ is the baseband precoding matrix with dimension $N_{RF} \times K$, $x^{RF}$ is the signal vector transmitted at the physical antenna ports with dimension $N_t \times 1$, s is the transmitted signal vector at the baseband with dimension $K \times 1$, i.e., one for each UE, and $x^{BB}$ is the signal vector transmitted from the baseband to the RF with dimension $N_{RF} \times 1$.

Similarly, the uplink signal detection before de-modulation can be formulated as $$\hat{s}=Gy^{RF}=GW_{ul}^{RF}y_{RF}=G^{BB}y^{BB}, \qquad (1.2)$$

where G is the effective global detection matrix with dimension $K \times N_t$, $W_{ul}^{RF}$ is the analog combining matrix at the RF with dimension $N_{RF} \times N_t$, $G^{BB}$ is the baseband detection matrix with dimension $K \times N_{RF}$, $y^{RF}$ is the received signal vector at the physical antenna ports with dimension $N_t \times 1$, $y^{BB}$ is the signal vector passed from the RF to the baseband of the BS with dimension $N_{RF} \times 1$, and $\hat{s}$ is the detected signal vector by the K UEs with dimension $K \times 1$, i.e., one for each UE.

Note that in (1.1) and (1.2), the matrices $W^{BB}$ and $G^{BB}$ are applied in the frequency domain at the baseband, which means that they can be different for each subcarrier, while $W_{dl}^{RF}$ or $W_{ul}^{RF}$ is applied in the time domain at the RF, which means that it keeps constant in the whole frequency band. Hence, any analog precoding/combining method that needs $W_{dl}^{RF}$ or $W_{ul}^{RF}$ to vary for different subcarriers in the frequency domain is not achievable.

For the downlink transmission, when the BS completes scheduling and UE grouping, it needs to compute the baseband precoding matrix for each RE based on the channel matrix of the MU-MIMO group on each RE seen from the baseband, i.e., $H_{dl}^{BB}$, which is defined as $$H_{dl}^{BB}=H_{dl}W_{dl}^{RF}, \qquad (1.3)$$

where $H_{dl}$ is the MU-MIMO channel matrix from all the physical antennas of the BS to the K UEs in the MU-MIMO group in the downlink. Note that the RE index is ignored for simplicity and clarity because it does not affect the application of this patent. Hence, the BS needs to compute a unique analog precoding matrix $W_{dl}^{RF}$ for the UEs to be served in the next period of time first, then $H_{dl}^{BB}$ is measured based on $W_{dl}^{RF}$.

For the uplink transmission, when the BS completes scheduling and UE grouping, it needs to compute the analog combing matrix $W_{ul}^{RF}$ for these UEs so that the channel matrix seen at the baseband for signal detection is $$H_{ul}^{BB}=H_{ul}W_{ul}^{RF}, \qquad (1.4)$$

Where $H_{ul}$ is the MU-MIMO channel matrix from all the physical antennas of the BS to the K UEs in a MU-MIMO group in the uplink. Note that the RE index is ignored for simplicity and clarity because it does not affect the application of this patent. Hence, the BS needs to compute a unique analog precoding matrix $W_{ul}^{RF}$ for the UEs to be served in the next period of time first, then $H_{ul}^{BB}$ is measured based on $W_{ul}^{RF}$.

For the analog precoding network in FIG. 1 and analog combining network shown in FIG. 2, each element of $W_{dl}^{RF}$ or $W_{ul}^{RF}$ can be chosen as any constant amplitude complex number, which is called Global Analog Beamforming (GAB), i.e., the signals of each RF chain are the weighted summation of signals from all the antennas in the uplink while the signal transmitted at each antenna is the weighted summation of signals from all the RF chains in the downlink.

Figure 3:
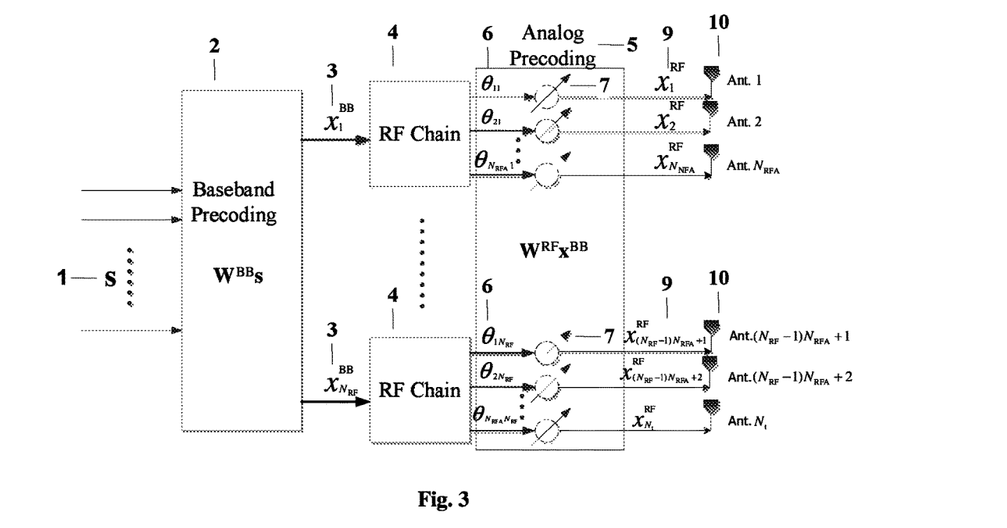
FIG. 3 shows the transmitter architecture of a BS with an example of partial analog precoding.
Figure 4:
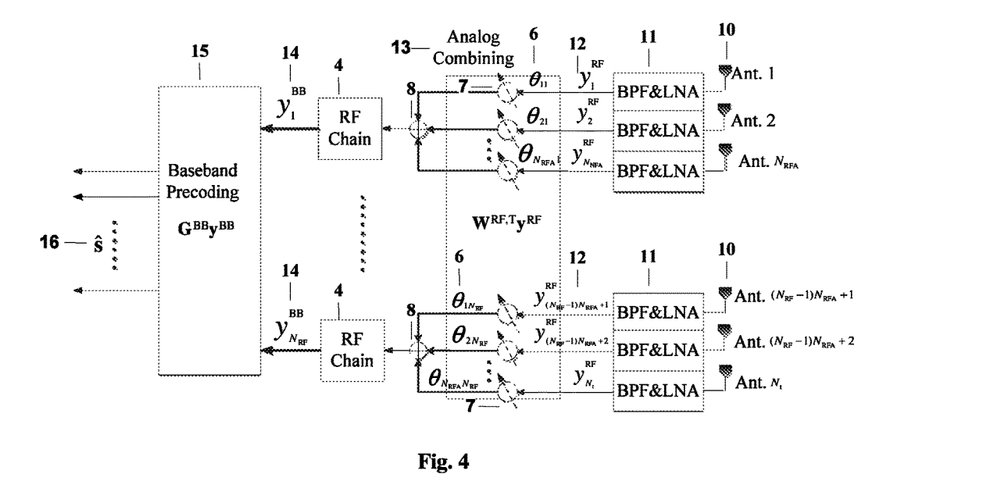
FIG. 4 shows the receiver architecture of a BS with an example of partial analog combing.

If except a part of the elements in $W_{dl}^{RF}$ or $W_{ul}^{RF}$ are non-zero constant amplitude complex numbers for the analog precoding network or analog combining network, the rest elements are all zero, it is called Partial Analog Beamforming (PAB), i.e., in the uplink, the signals of each RF chain are the weighted summation of signals from part of the antennas, while in the downlink, the signals transmitted at each antenna are the weighted summation of signals from part of the antennas. Specially, in FIG. 3 and FIG. 4, a particular PAB example is presented, where each RF chain is connected to $N_{RFA}$ different antenna ports so that $N_t = N_{RFA}/N_{RF}$.

Figure 5:
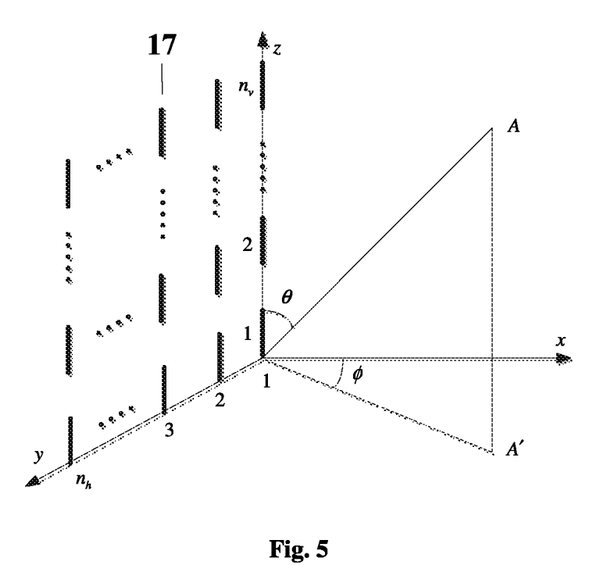
FIG. 5 shows a planar antenna array with single polarized antennas.
Figure 6:
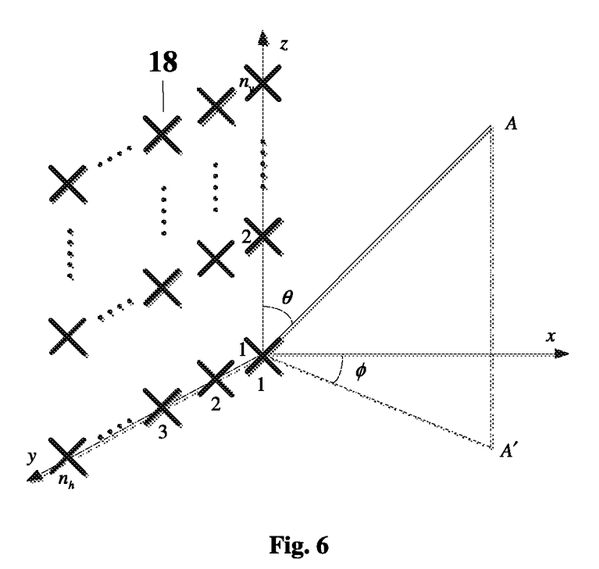
FIG. 6 shows a planar antenna array with cross-polarized antennas.

For the antenna array at the BS side, one embodiment is shown in FIG. 5, where the $N_t$ single polarized antennas 17 are placed as a planer array with $n_h$ antennas per row with space $d_h$ in terms of wavelength in the horizontal dimension and $n_v$ antennas per column with space $d_v$ in terms of wavelength in the vertical dimension. The antennas are indexed along the horizontal dimension first, then the vertical dimension. Another embodiment is shown in FIG. 6, where the $N_t$ antennas are cross-polarized antennas 18, rather than single polarized antennas employed in FIG. 5.

To compute $W_{dl}^{RF}$ or $W_{ul}^{RF}$ for the served $N_{ue}$ UEs, the BS needs to construct a subspace for the channel vector between the BS antenna array and each UE. Two methods can be used to realize this process.

Method I:

The first method is suited for both Frequency-Division Duplex (FDD) systems and Time-Division Duplex (TDD) systems, where each UE transmits pilots or Reference Signals (RSs) in the specific uplink channel first, e.g., Sounding Reference Signal (SRS) channel in LTE/LTE-A. Then, the BS uses an analog combing matrix $W_{ul,rs}^{RF}$ to combine the received signals of all the antennas and passes the combined signals to the baseband to estimate the principal spatial angles and the corresponding gains contained in the estimated partial channel vectors based on the RSs. With these angles information and the corresponding gains, the BS constructs a subspace for each UE as $V_k$. Finally, $W_{dl}^{RF}$ and $W_{ul}^{RF}$ are constructed with $V_k$, k=1, ..., $N_{ue}$.

An embodiment of this patent for GAB with Method I is provided below. Take FIG. 5 as an example. At the BS side, after combined by the analog combining matrix $W_{ul,rs}^{RF}$ for RSs, the received signals are passed to the baseband. Let $r_{rf}(t)$ and $r_{bb}(t)$ denote the received pilot signals at the physical antennas and the signals after combined and passed to the baseband at the time instant t, then their relation is written as $$r_{bb}(t) = W_{ul,rs}^{RF} r_{rf}(t). \tag{1.5}$$

Different structures of $W_{ul,rs}^{RF}$ denote different antenna virtualization methods or analog combining network at the RF. For GAB, the received signals from the antennas of any row or the superposition of multiple rows are reserved for the horizontal dimension. A similar method is applied to the columns of the antenna array for the vertical dimension. With the assumption $n_h + n_v \leq N_{RF}$, two typical embodiments of the choices of $W_{ul,rs}^{RF}$ are and $$W_{ul,rs}^{RF} = \begin{bmatrix} I_{n_h} & 0 & \cdots & 0 \\ E_1 & E_2 & \cdots & E_{n_v} \\ 0 & 0 & \cdots & 0 \end{bmatrix}, \tag{1.6}$$

$$W_{ul,rs}^{RF} = \begin{bmatrix} I_{n_h} & I_{n_h} & \cdots & I_{n_h} \\ A_1 & A_2 & \cdots & A_{n_v} \\ 0 & 0 & \cdots & 0 \end{bmatrix}, \tag{1.7}$$

where $E_k$, k=1, ..., $n_v$, denotes a $n_v \times n_h$ matrix with all 0 except one 1 on the first element of the kth row, $A_k$, k=1, ..., $n_v$, denotes a $n_v \times n_h$ matrix with all 0 except all 1 on the kth row, and 0 is a $(N_{RF} - n_v - n_h) \times n_h$ matrix with all 0. Note that if the condition $n_h + n_v \leq N_{RF}$ cannot be satisfied, the signals at the antenna can be further down-sampled in the horizontal and vertical dimensions respectively, i.e., the signals from part of a row and a column of antennas are passed to the baseband. With $r_{bb}(t)$, after a series of baseband processing, i.e., A/D, Cyclic Prefix (CP) removal, Fast Fourier Transformation (FFT), etc., the signals are used to estimate the channel on the sampled antennas by the methods such as in [12]. Let the $n_h \times 1$ vectors $\hat{h}_k^{hor}(i)$ and $n_v \times 1$ vectors $\hat{h}_k^{ver}(i)$, i=1, ..., $n_{rs}$, denote the two sets of estimated channel vectors of the kth user on the pilot subcarriers in the horizontal and vertical dimensions respectively, where $n_{rs}$ is the number of subcarriers for pilot signals. Then, the first principal steering vector to represent the channel of the kth user in the horizontal dimension is estimated by $$\hat{e}_k^{hor}(\theta_k^{hor}) = \operatorname{argmax} e_{n_h}^H(\theta) \hat{R}_k^{hor} e_{n_h}(\theta), \tag{1.8}$$

where $$\hat{R}_k^{hor} = \sum_{i=1}^{n_{rs}} \hat{h}_k^{hor}(i) \hat{h}_k^{hor,H}(i), \tag{1.9}$$

and $$e_{n_h}(\theta) = [1 \, e^{j2\pi d_h \theta} \, \cdots \, e^{j2\pi(n_h-1)d_h\theta}]^T. \tag{1.10}$$

Similarly, the first principal steering vector to represent the channel of the kth user in the vertical dimension is estimated by $$\hat{e}_k^{ver}(\theta_k^{ver}) = \operatorname{argmax} e_{n_v}^H(\theta) \hat{R}_k^{ver} e_{n_v}(\theta), \tag{1.11}$$

where $$\hat{R}_k^{ver} = \sum_{i=1}^{n_{rs}} \hat{h}_k^{ver}(i) \hat{h}_k^{ver,H}(i), \tag{1.12}$$

and $$e_{n_v}(\theta) = [1 \, e^{j2\pi d_v \theta} \, \cdots \, e^{j2\pi(n_v-1)d_v\theta}]^T. \tag{1.13}$$

Next, an $n_h \times n_h$ unitary matrix is constructed with $\hat{\theta}_k^{hor}$ as $$U_k^{hor} = \left\{ e_{n_h}(\theta_k^l) \mid \theta_k^l = \hat{\theta}_k^{hor} + \frac{2l}{n_h}, \theta_k^l \in [-1, 1), l \in \mathbb{z} \right\}, \tag{1.14}$$

which is used to search the other directions of the channel vector in the horizontal direction. Similarly, an $n_v \times n_v$ unitary matrix is constructed with $\hat{\theta}_k^{ver}$ as $U_k^{ver}$ with the same method as the horizontal dimension. Let $Q_k^{hor} = U_k^{hor,H} \hat{R}_k^{hor} U_k^{hor}$ and $d^{hor}$ be the vector consisted of the diagonal elements of $Q_k^{hor}$, where each element of $d^{hor}$ corresponds to a different column vector in $U_k^{hor}$, then a $d^{hor} \times 1$ vector $d^{hor}$ is constructed by the $\hat{d}^{hor}$ largest values in $d^{hor}$. Next, a matrix $\hat{U}_k^{hor}$ is constructed with the vectors in $U_k^{hor}$ corresponding to the values in $d^{hor}$. Obviously, $\hat{U}_k^{hor}$ is consisted of the orthogonal directions with the $\hat{d}^{hor}$ largest energy of the channel vectors in the horizontal direction. The final estimated subspace of the kth user in the horizontal dimension can be constructed as $$V_k^{hor} = \hat{U}_k^{hor} \text{diag}(\hat{d}^{hor}/\|\hat{d}^{hor}\|_2), \tag{1.15}$$

where diag(d) denotes the diagonal matrix with diagonal elements from d and the dimension of $V_k^{hor}$ is $n_h \times d^{hor}$. The subspace of the kth user in the vertical dimension can be constructed as $V_k^{ver}$ similarly with a dimension of $n_v \times d^{ver}$. Finally, the subspace of the channel vector of the kth user is constructed as $$V_k = V_k^{ver} \otimes V_k^{hor}. \tag{1.16}$$

Note that if the antenna indexing order in FIG. 5 is changed to be vertical dimension first then the horizontal dimension, then (1.16) is changed to $V_k = V_k^{hor} \otimes V_k^{ver}$.

An embodiment of this patent for PAB with Method I is provided below. Still taking the antenna arrays in FIG. 5 as an example, the signals of every $n_{rfa}$ consecutive antennas per column are weighted combined and passed to a RF chain i.e., the antenna virtualization along the vertical dimension, which means that $N_{RF} n_{rfa} = N_t$ and $n_v^{SP} = n_v/n_{rfa}$ is an integer. For the received reference signal, one embodiment of $W_{ul,rs}^{RF}$ is chosen such that the signals from each antenna of the first row are passed to the baseband. Moreover, the signals from one of every $n_{rfa}$ consecutive antennas in the first column are passed to the baseband. The choice of antennas can also be any other row and column or multiple rows and multiple columns if the number of total number of connected antennas is smaller than $N_{RF}$. Note that the space of the selected $n_v^{SP}$ antennas in the first column can be non-uniform and their intervals relative to the first antenna are $d_v^{SP}(i)$, $i=0, \ldots, n_v^{SP}-1$, in terms of wavelength. Hence, the signals from $n_h + n_v^{SP} - 1$ antennas are passed to the baseband, where the first $n_h$ signals are used to estimate the channel on the horizontal dimension while the $n_v^{SP}$ signals from the first column are used to estimate the channel on the vertical dimension. When these signals are passed to the baseband, after a series of baseband processing, i.e., A/D, CP removal, FFT, etc., the signals are used to estimate the channel on the selected antennas by the methods such as in [12]. Let the $n_h \times 1$ vectors $\hat{h}_k^{hor}(i)$ and $n_v^{SP} \times 1$ vectors $\hat{h}_k^{ver}(i)$, $i=1, \ldots, n_{rs}$, denote the two sets of estimated channel vectors of the kth user on the pilot subcarriers in the horizontal and vertical dimensions respectively, where $n_{rs}$ is the number of subcarriers for pilot signals. Then, the first principal steering vector to represent the channel of the kth user in the horizontal dimension is estimated by (1.8)-(1.10) as $\hat{e}_k^{hor}(\hat{\theta}_k^{hor})$. Similarly, the first principal steering vector to represent the channel of the kth user in the vertical dimension is estimated by (1.11) and (1.12) as $\hat{e}_k^{ver}(\hat{\theta}_k^{ver})$, where the steering vector in (1.11) is replaced by $$e_{n_v}^{SP}(\theta) = [1\, e^{j2\pi d_v^{SP}(1)\theta} \ldots e^{j2\pi d_v^{SP}(n_v^{SP}-1)\theta}]^T, \tag{1.17}$$

Next, an $n_h \times n_h$ unitary matrix $U_k^{hor}$ is constructed with $\hat{\theta}_k^{hor}$ as in (1.14) and the subspace $V_k^{hor}$ in the horizontal dimension is constructed as in (1.15). Finally, the subspace of the channel vector of the kth user is constructed as $$V_k = V_k^{ver} \otimes V_k^{hor}, \tag{1.18}$$

where $V_k^{ver} = [1\, e^{j2\pi d_v \hat{\theta}_k^{ver}} \ldots e^{j2\pi(n_v-1)d_v \hat{\theta}_k^{ver}}]^T$. Note that if the antenna indexing order in FIG. 5 is changed to be vertical dimension first then the horizontal dimension, then (1.18) is changed to $V_k = V_k^{hor} \otimes V_k^{ver}$.

An embodiment of this patent for PAB with Method I is provided below. Still taking the antenna array in FIG. 5 as an example, the signals of every $n_{rfa}$ antennas per column, i.e., an antenna group, are weighted combined and connected to a RF chain. Moreover, more than one antennas are contained in the two neighbor antennas groups, i.e., the neighbor two groups are partly overlapped, which means that the number of RF chains $n_v^{SP}$ connected to one column of antennas satisfies $n_v/n_{rfa} < n_v^{SP} < n_v$. For the received reference signal, one embodiment of $W_{ul,rs}^{RF}$ is chosen such that the signals from each antenna of the first row are passed to the baseband. Moreover, the signals from $n_v^{SP}$ different antennas in the $n_v^{SP}$ antenna groups in the first column are passed to the baseband. The choice of antennas can also be any other row and column or multiple rows and multiple columns if the number of total number of antennas connected to RF chains is smaller than $N_{RF}$. Note that the space of the selected $n_v^{SP}$ antennas in the first column can be non-uniform and their intervals relative to the first antenna are $d_v^{SP}(i)$, $i=0, \ldots, n_v^{SP}-1$, in terms of wavelength. Hence, the signals from $n_h + n_v^{SP} - 1$ antennas are passed to the baseband, where the first $n_h$ signals are used to estimate the channel on the horizontal dimension while the $n_v^{SP}$ signals from the first column are used to estimate the channel on the vertical dimension. When these signals are passed to the baseband, after a series of baseband processing, i.e., A/D, CP removal, FFT, etc., the signals are used to estimate the channel on the selected antennas by the methods such as in [12]. Let the $n_h \times 1$ vectors $\hat{h}_k^{hor}(i)$ and $n_v^{SP} \times 1$ vectors $\hat{h}_k^{ver}(i)$, $i=1, \ldots, n_{rs}$, denote the two sets of estimated channel vectors of the kth user on the pilot subcarriers in the horizontal and vertical dimensions respectively, where $n_{rs}$ is the number of subcarriers for pilot signals. Then, the first principal steering vector to represent the channel of the kth user in the horizontal dimension is estimated by (1.8)-(1.10) as $\hat{e}_k^{hor}(\hat{\theta}_k^{hor})$. Similarly, the first principal steering vector to represent the channel of the kth user in the vertical dimension is estimated by (1.11) and (1.12) as $\hat{e}_k^{ver}(\hat{\theta}_k^{ver})$, where the steering vector in (1.11) is replaced by $$e_{n_v}^{SP}(\theta) = [1 e^{j2\pi d_v^{SP}(1)\theta} \ldots e^{j2\pi d_v^{SP}(n_v^{SP}-1)\theta}]^T. \tag{1.19}$$

Next, an $n_h \times n_h$ unitary matrix $U_k^{hor}$ is constructed with $\hat{\theta}_k^{hor}$ as in (1.14) and the subspace $V_k^{hor}$ in the horizontal dimension is constructed as in (1.15). Finally, the subspace of the channel vector of the kth user is constructed as $$V_k = V_k^{ver} \otimes V_k^{hor}, \tag{1.20}$$

where $V_k^{ver} = [1\, e^{j2\pi d_v \hat{\theta}_k^{ver}} \ldots e^{j2\pi(n_v-1)d_v \hat{\theta}_k^{ver}}]^T$. Note that if the antenna indexing order in FIG. 5 is changed to be vertical dimension first then the horizontal dimension, then (1.18) is changed to $V_k = V_k^{hor} \otimes V_k^{ver} \otimes$ Another embodiment of this patent for PAB with Method I is provided below. For this type of analog beamforming, the signals of every $n_{rfa}$ consecutive antennas per row are weighted combined and passed to a RF chain, i.e., the antenna virtualization along the horizontal dimension, which means that $N_{RF} n_{rfa} = N_t$ and $n_h^{SP} = n_h/n_{rfa}$ is an integer. For the received reference signal, one embodiment of $W_{ul,rs}^{RF}$ is chosen such that the signals from each antenna of the first column are passed to the baseband. Moreover, the signals from one of every $n_{rfa}$ consecutive antennas in the first row are passed to the baseband. The choice of antennas can also be any other row and column or multiple rows and multiple columns if the number of total number of connected antennas is smaller than $N_{RF}$. Note that the space of the selected $n_h^{sp}$ antennas can be non-uniform and the intervals of the selected $n_h^{sp}$ antennas relative to the first antenna are $d_h^{sp}(i)$, i=0, ..., $n_h^{sp}-1$, in term of wavelength. Hence, the signals from the $n_v+n_h^{sp}-1$ antennas are passed to the baseband, where the first $n_v$ signals from the $n_v$ antennas in the first column are used to estimate the channel on the vertical dimension while the $n_h^{sp}$ signals from the $n_h^{sp}$ antennas in the first column are used to estimate the channel on the horizontal dimension. When these signals are passed to the baseband, after a series of baseband processing, i.e., A/D, CP removal, FFT, etc., the signals are used to estimate the channel on the sampled antennas by the methods such as in [12]. Let the $n_h^{sp} \times 1$ vectors $\hat{h}_k^{hor}(i)$ and $n_v \times 1$ vectors $h_k^{ver}(i)$, i=1, ..., $n_{rs}$, denote the two sets of estimated channel vectors of the kth user on the pilot subcarriers in the horizontal and vertical dimensions respectively, where $n_{rs}$ is the number of subcarriers for pilot signals. Then, the first principal steering vector to represent the channel of the kth user in the horizontal dimension is estimated by (1.8) and (1.9) as $\hat{e}_k^{hor}(\overline{\theta}_k^{hor})$, where the steering vector in (1.8) is replaced by $$e_{n_h}^{sp}(\theta) = [1 e^{j2\pi d_h^{sp}(1)\theta} \ldots e^{j2\pi d_h^{sp}(n_h^{sp}-1)\theta}]^T. \quad (1.21)$$

Similarly, the first principal steering vector to represent the channel of the kth user in the vertical dimension is estimated by (1.11)-(1.13) as $\hat{e}_k^{ver}(\overline{\theta}_k^{ver})$. Next, an $n_v \times n_v$ unitary matrix $U_k^{ver}$ is constructed with $\hat{\theta}_k^{ver}$ as in (1.14) and the subspace $V_k^{ver}$ in the vertical dimension is constructed as in (1.15). Finally, the subspace of the channel vector of the kth user is constructed as $$V_k = V_k^{ver} \otimes V_k^{hor}, \quad (1.22)$$

Where $V_k^{hor} = [1 \; e^{j2\pi d_h \hat{\theta}_k^{hor}} \ldots e^{j2\pi(n_h-1)d_h \hat{\theta}_k^{hor}}]^T$. Note that if the antenna indexing order in FIG. 5 is changed to be vertical dimension first then the horizontal dimension, then (1.22) is changed to $V_k = V_k^{hor} \otimes V_k^{ver}$.

Another embodiment of this patent for PAB with Method I is provided below. For this type of analog beamforming, the signals of every $n_{rfa,h}$ consecutive antennas per row and every $n_{rfa,v}$ consecutive antennas per column are weighted combined and passed to a RF chain, i.e., the 2-Dimension (2D) antenna virtualization, which means that $N_{RF} n_{rfa,h} n_{rfa,v} = N_t$, $n_h^{sp} = n_h/n_{rfa,h}$ and $n_v^{sp} = n_v/n_{rfa,v}$ are two integers. For the received reference signal, one embodiment of $W_{ul,rs}^{RF}$ is chosen such that the signals from one of every $n_{rfa,h}$ consecutive antennas in the first row are passed to the baseband. Moreover, the signals from one of every $n_{rfa,v}$ consecutive antennas in the first row are passed to the baseband. The choice of antennas can also be any other row and column or multiple rows and multiple columns if the number of total number of connected antennas is smaller than $N_{RF}$. The space of the selected $n_h^{sp}$ antennas can be non-uniform and the intervals of the selected $n_h^{sp}$ antennas relative to the first antenna are $d_h^{sp}(i)$, i=0, ..., $n_h^{sp}-1$, in term of wavelength. The space of the selected $n_v^{sp}$ antennas can be non-uniform and the intervals of the selected $n_v^{sp}$ antennas relative to the first antenna are $d_v^{sp}(i)$, i=0, ..., $n_v^{sp}-1$, in term of wavelength. Hence, the signals from the $n_v^{sp}+n_h^{sp}$ antennas are passed to the baseband, where the first $n_v^{sp}$ signals from the $n_v^{sp}$ antennas in the first column are used to estimate the channel on the vertical dimension while the $n_h^{sp}$ signals from the $n_h^{sp}$ antennas in the first column are used to estimate the channel on the horizontal dimension. When these signals are passed to the baseband, after a series of baseband processing, i.e., A/D, CP removal, FFT, etc., the signals are used to estimate the channel on the sampled antennas by the methods such as in [12]. Let the $n_h^{sp} \times 1$ vectors $\hat{h}_k^{hor}(i)$ and $n_v^{sp} \times 1$ vectors $\hat{h}_k^{ver}(i)$, i=1, ..., $n_{rs}$, denote the two sets of estimated channel vectors of the kth user on the pilot subcarriers in the horizontal and vertical dimensions respectively, where $n_{rs}$ is the number of subcarriers for pilot signals. Then, the first principal steering vector to represent the channel of the kth user in the horizontal dimension is estimated by (1.8) and (1.9) as $\hat{e}_k^{hor}(\overline{\theta}_k^{hor})$, where the steering vector in (1.8) is replaced by $$e_{n_h}^{sp}(\theta) = [1 e^{j2\pi d_h^{sp}(1)\theta} \ldots e^{j2\pi d_h^{sp}(n_h^{sp}-1)\theta}]^T. \quad (1.23)$$

Similarly, the first principal steering vector to represent the channel of the kth user in the vertical dimension is estimated by (1.11) and (1.12) as $\hat{e}_k^{ver}(\overline{\theta}_k^{ver})$, where the steering vector in (1.11) is replaced by $$e_{n_v}^{sp}(\theta) = [1 e^{j2\pi d_v^{sp}(1)\theta} \ldots e^{j2\pi d_v^{sp}(n_v^{sp}-1)\theta}]^T. \quad (1.24)$$

Next, an $n_h^{sp} \times n_h$ matrix $U_k^{hor}$ is constructed with $\hat{\theta}_k^{hor}$ as $$U_k^{hor} = \left\{ e_{n_h}^{sp}(\theta_k^l) \middle| \theta_k^l = \hat{\theta}_k^{hor} + \frac{2l}{n_h}, \theta_k^l \in [-1, 1), l \in z \right\}, \quad (1.25)$$

which is used to search the other directions of the channel vector in the horizontal direction. Let $Q_k^{hor} = U_k^{hor,H} \hat{R}_k^{hor} U_k^{hor}$ and $d^{hor}$ be the vector consisted of the diagonal elements of $Q_k^{hor}$, where each element of $d^{hor}$ corresponds to a different column vector in $U_k^{hor}$, then a $d^{hor} \times 1$ vector $\hat{d}^{hor}$ is constructed by the $d^{hor}$ largest values in $d^{hor}$. Next, a matrix $\hat{U}_k^{hor}$ is constructed with the vectors in $U_k^{hor}$ corresponding to the values in $d^{hor}$. Obviously, $\hat{U}_k^{hor}$ is consisted of the orthogonal directions with the $d^{hor}$ largest energy of the channel vectors in the horizontal direction. The final estimated subspace of the kth user in the horizontal dimension can be constructed as $V_k^{hor} = \hat{U}_k^{hor}$. The subspace $V_k^{ver}$ in the vertical dimension is constructed similarly as $V_k^{hor}$. Finally, the subspace of the channel vector of the kth user is constructed as $$V_k = V_k^{ver} \otimes V_k^{hor}. \quad (1.26)$$

Note that if the antenna indexing order in FIG. 5 is changed to be vertical dimension first then the horizontal dimension, then (1.22) is changed to $V_k = V_k^{hor} \otimes V_k^{ver}$.

Method II:

This second method is suited for both FDD systems and TDD systems. The BS transmits CSI pilot or RS in the downlink first, e.g., CSI-RS in LTE/LTE-A, where the analog precoding matrix $W_{dl,rs}^{RF}$ is used for the RS. Then, with the received pilot signals, each UE estimates the angles of the channel vector and their corresponding gains in the horizontal and vertical dimensions respectively. After that, the UE feeds back the angles and gains information to the BS through the specific uplink channel, e.g., Physical Uplink Control Channel (PUCCH) in LTE/LTE-A. Finally, the BS constructs a subspace for each UE with the angles and gains information.

An embodiment of this patent for GAB with Method II is provided in this section. At the BS side, only a part of the antennas needs to transmit CSI-RS, e.g., the antennas of the first row and the first column. The choice of antennas can also be any other row and column or multiple rows and multiple columns. This can be realized by selecting $W^{BB} = [I_K \; 0]T$, where 0 is an $(N_{RF}-K) \times K$ zero matrix, and $$W_{dl,rs}^{RF} = \begin{bmatrix} I_{n_h} & 0 & \cdots & 0 \\ 0 & E_2 & \cdots & E_{n_v} \\ 0 & 0 & \cdots & 0 \end{bmatrix}^T, \quad (1.27)$$

where $E_k$, $k=2, \ldots, n_v$, denotes a $n_v \times n_h$ matrix with all 0 except one 1 on the first element of the kth row. The pilots for the $n_h+n_v-1$ antennas are transmitted in $n_h+n_v-1$ different REs, e.g., for the lth antenna, $l=1, \ldots, n_h+n_v-1$, the pilot signal transmitted at the $N_t$ antennas can be formulated as $x^{RF}=W_{dl,rs}^{RF}W^{BB}s_{rs}^l$, where $s_{rs}^l$ is an all 0 vector except the lth element. For the kth UE, let the $n_h \times 1$ vectors $\hat{h}_k^{hor}(i)$ and $n_v \times 1$ vectors $\hat{h}_k^{ver}(i)$, $i=1, \ldots, n_{rs}$, denote the two sets of estimated channel vectors on the pilot subcarriers in the horizontal and vertical dimensions respectively, where $n_{rs}$ is the number of subcarriers for pilot signals. Then, the first principal steering vector to represent the channel of the kth user in the horizontal dimension is estimated as $\hat{e}_k^{hor}(\bar{\theta}_k^{hor})$ with the same method in (1.8)-(1.10). Similarly, the first principal steering vector to represent the channel of the kth user in the vertical dimension is estimated as $\hat{e}_k^{ver}(\bar{\theta}_k^{ver})$ with the same method in (1.11)-(1.13). Next, an $n_h \times n_h$ unitary matrix $U_k^{hor}$ is constructed with $\hat{\theta}k^{hor}$ as in (1.14), which is used to search the other directions of the channel vector in the horizontal direction. Similarly, an $n_v \times n_v$ unitary matrix is constructed with $\hat{\theta}_k^{ver}$ as $U_k^{ver}$ with the same method as the horizontal dimension. Let $Q_k^{hor} = U_k^{hor,H}\hat{R}_k^{hor}U_k^{hor}$ and $d^{hor}$ be the vector consisted of the diagonal elements of $Q_k^{hor}$, where each element of $d^{hor}$ corresponds to a different column steering vector in $U_k^{hor}$, then the two $d^{hor} \times 1$ vectors $\hat{d}^{hor}$ and $\hat{\theta}^{hor}$ are constructed by the $d^{hor}$ largest values in $d^{hor}$ and the corresponding angles contained in the column vectors of $U_k^{hor}$. The two $d^{ver} \times 1$ vectors $\hat{d}^{ver}$ and $\bar{\theta}^{ver}$ are constructed similarly to the horizontal case. Then, the elements of $\hat{d}^{hor}$, $\hat{d}^{ver}$, $\hat{\theta}^{hor}$, and $\hat{\theta}^{ver}$ are quantized and fed back to the BS through specific uplink channel by the UE. With $\hat{\theta}^{hor}$, the BS constructs a unitary matrix with the $d^{hor}$ steering vectors and the $d^{hor}$ angles in $\hat{\theta}^{hor}$. Then, the subspace in the horizontal dimension is constructed as $$V_k^{hor} = \hat{U}_k^{hor}\text{diag}(\hat{d}^{hor}/\|\hat{d}^{hor}\|_2), \quad (1.28)$$

where diag(d) denotes the diagonal matrix with diagonal elements from d and the dimension of $V_k^{hor}$ is $n_h \times d^{hor}$. The subspace of the kth user in the vertical dimension can be constructed as $V_k^{ver}$ similarly with a dimension of $n_h \times d^{ver}$. Finally, the subsapce of the channel vector of the kth user is constructed as $$V_k = V_k^{ver} \otimes V_k^{hor}. \quad (1.29)$$

Note that if the antenna indexing order in FIG. 5 is changed to be vertical dimension first then the ⊗ horizontal dimension, then (1.29) is changed to $V_k = V_k^{hor} \otimes V_k^{ver}$.

An embodiment of this patent for PAB with Method II is provided below. For this type of analog beamforming, the signals of every $n_{rfa}$ consecutive antennas per row are different phase shifted versions of the signal from a single RF chain, i.e., the antenna virtualization along the horizontal dimension, which means that $N_{RF}n_{rfa}=N_t$ and $n_h^{sp}=n_h/n_{rfa}$ is an integer. For transmitting the downlink CSI-RS, one embodiment of $W_{dl,rs}^{RF}$ is chosen such that only one of every $n_{rfa}$ consecutive antennas in the first row of the antenna array is connected to a RF chain. Moreover, each antenna of the first column of the antenna array is connected to a RF chain. The choice of antennas can also be any other row and column or multiple rows and multiple columns if the number of total number of connected antennas is smaller than $N_{RF}$. Note that the space of the selected $n_h^{sp}$ antennas can be non-uniform and the intervals of the selected antennas relative to the first antenna is $d_h^{sp}(i)$, $i=0, \ldots, n_h^{sp}-1$, in terms of wavelength. Hence, only the selected $n_v+n_h^{sp}-1$ antennas need to transmit CSI-RS, where the pilot signals of the first $n_v$ antennas in the first column are used to estimate the channel on the vertical dimension while the pilot signals of $n_h^{sp}$ signals from the antennas of the first row are used to estimate the channel on the horizontal dimension. For the kth UE, let the $n_h^{sp} \times 1$ vectors $\hat{h}_k^{hor}(i)$ and $n_v \times 1$ vectors $\hat{h}_k^{ver}(i)$, $i=1, \ldots, n_{rs}$, denote the two sets of estimated channel vectors on the pilot subcarriers in the horizontal and vertical dimensions respectively, where $n_{rs}$ is the number of subcarriers for pilot signals. Then, the first principal steering vector to represent the channel of the kth user in the horizontal dimension is estimated as $\hat{e}_k^{hor}(\bar{\theta}_k^{hor})$ with the same method in (1.8) and (1.9) with $e_{n_h^{sp}}(\theta) = [1 \; e^{j2\pi d_h^{sp}(1)\theta} \; \ldots \; e^{j2\pi d_h^{sp}(n_h^{sp}-1)\theta}]^T$. Similarly, the first principal steering vector to represent the channel of the kth user in the vertical dimension is estimated as $\hat{e}_k^{ver}(\bar{\theta}_k^{ver})$ with the same method in (1.11)-(1.13). Next, an $n_v \times n_v$ unitary matrix $U_k^{ver}$ is constructed with $\hat{\theta}_k^{ver}$ as in (1.14), which is used to search the other directions of the channel vector in the horizontal direction. Let $Q_k^{ver} = U_k^{ver,H}\hat{R}_k^{ver}U_k^{ver}$ and $d^{ver}$ be the vector consisted of the diagonal elements of $Q_k^{ver}$, where each element of $d^{ver}$ corresponds to a different column steering vector in $U_k^{ver}$, then the two $d^{ver} \times 1$ vectors $\hat{d}^{ver}$ and $\hat{\theta}^{ver}$ are constructed by the $d^{ver}$ largest values in $d^{ver}$ and the corresponding angles in the column vectors of $U_k^{ver}$. Then, $\hat{\theta}_k^{ver}$ and the elements of $d^{ver}$ and $\hat{\theta}^{ver}$ are quantized and fed back to the BS through specific uplink channel by the UE. With $\hat{\theta}^{ver}$, the BS constructs a unitary matrix with the $d^{ver}$ steering vectors and the $d^{ver}$ angles in $\hat{\theta}^{ver}$. Then, the subspace in the vertical dimension is constructed as $$V_k^{ver} = \hat{U}_k^{ver}\text{diag}(\hat{d}^{ver}/\|\hat{d}^{ver}\|_2), \quad (1.30)$$

where diag(d) denotes the diagonal matrix with diagonal elements from d and the dimension of $V_k^{ver}$ is $n_v \times d^{ver}$. The horizontal subspace is constructed as $$V_k^{hor} = [1 \; e^{j2\pi d_h \hat{\theta}_k^{hor}} \ldots \; e^{j2\pi(n_h-1)d_h \hat{\theta}_k^{hor}}]^T.$$

Finally, the subspace of the channel vector of the kth user is constructed as $$V_k = V_k^{ver} \otimes V_k^{hor}. \quad (1.32)$$

Note that if the antenna indexing order in FIG. 5 is changed to be vertical dimension first then the horizontal dimension, then (1.32) is changed to $V_k = V_k^{hor} \otimes V_k^{ver}$.

Another embodiment of this patent for PAB with Method II is provided below. For this type of analog beamforming, the signals of every $n_{rfa}$ consecutive antennas per column are different phase shifted versions of the signal from a single RF chain, i.e., the antenna virtualization along the vertical dimension, which means $N_{RF}n_{rfa}=N_t$ and $n_v^{sp}=n_v/n_{rfa}$ is an integer. For transmitting the downlink CSI-RS, one embodiment of the analog precoding matrix $W_{dl,rs}^{RF}$ for CSI-RS is chosen such that only one of every $n_{rfa}$ consecutive antennas in the first column of the antenna array is connected to a RF chain. Moreover, each antenna of the first row of the antenna array is connected to a RF chain. The choice of antennas can also be any other row and column or multiple rows and multiple columns if the number of total number of connected antennas is smaller than $N_{RF}$. Note that the space of the selected $n_v^{sp}$ antennas can be non-uniform and the intervals of the selected antennas relative to the first antenna is $d_v^{sp}(i)$, $i=0, \ldots, n_v^{sp}-1$, in terms of wavelength. Hence, only the selected $n_h+n_v^{sp}-1$ antennas need to transmit CSI-RS, where the pilot signals of the $n_h$ antennas in the first row are used to estimate the channel on the horizontal dimension while the pilot signals of $n_v^{sp}$ antennas of the first column are used to estimate the channel on the vertical dimension. For the kth UE, let the $n_h \times 1$ vectors $\hat{h}_k^{hor}(i)$ and $n_v^{sp} \times 1$ vectors $\hat{h}_k^{ver}(i)$, $i=1, \ldots, n_{rs}$, denote the two sets of estimated channel vectors on the pilot subcarriers in the horizontal and vertical dimensions respectively, where $n_{rs}$ is the number of subcarriers for pilot signals. Then, the first principal steering vector to represent the channel of the kth user in the horizontal dimension is estimated as $\hat{e}_k^{hor}(\bar{\theta}_k^{hor})$ with the same method in (1.8)-(1.10). Similarly, the first principal steering vector to represent the channel of the kth user in the vertical dimension is estimated as $\hat{e}_k^{ver}(\bar{\theta}_k^{ver})$ with the same method in (1.11) and (1.12) with $e_{n_v}^{sp}(\theta) = [1 \ e^{j2\pi d_v^{sp}(1)\theta} \ldots e^{j2\pi d_v^{sp}(n_v^{sp}-1)\theta}]^T$. Next, an $n_h \times n_h$ unitary matrix $U_k^{hor}$ is constructed with $\hat{\theta}_k^{hor}$ as in (1.14), which is used to search the other directions of the channel vector in the horizontal direction. Let $Q_k^{hor} = U_k^{hor,H}\hat{R}_k^{hor}U_k^{hor}$ and $d^{hor}$ be the vector consisted of the diagonal elements of $Q_k^{hor}$, where each element of $d^{hor}$ corresponds to a different column steering vector in $U_k^{hor}$, then the two $d^{hor} \times 1$ vectors $d^{hor}$ and $\hat{\theta}_k^{hor}$ are constructed by the $d^{hor}$ largest values in $d^{hor}$ and the corresponding angles contained in the column vectors of $U_k^{hor}$. Then, $\hat{\theta}_k^{hor}$ and the elements of $d^{hor}$ and $\hat{\theta}^{hor}$ are quantized and fed back to the BS through specific uplink channel by the UE. The BS constructs a unitary matrix with the $d^{hor}$ steering vectors based on the $d^{hor}$ angles in $\hat{\theta}_k^{hor}$. Then, the subspace in the horizontal dimension is constructed as $$V_k^{hor} = \hat{U}_k^{hor} \text{diag}(\hat{d}^{hor}/\|\hat{d}^{hor}\|_2), \quad (1.33)$$

where diag(d) denotes the diagonal matrix with diagonal elements from d and the dimension of $V_k^{hor}$ is $n_h \times d^{hor}$. The vertical subspace is constructed as $$V_k^{ver} = [1 \ e^{j2\pi d_v \hat{\theta}_k^{ver}} \ldots e^{j2\pi(n_v-1)d_v\hat{\theta}_k^{ver}}]^T.$$

Finally, the subspace of the channel vector of the kth user is constructed as $$V_k = V_k^{ver} \otimes V_k^{hor}. \quad (1.35)$$

Note that if the antenna indexing order in FIG. 5 is changed to be vertical dimension first then the ⊗ horizontal dimension, then (1.35) is changed to $V_k = V_k^{hor} \otimes V_k^{ver}$.

Another embodiment of this patent for PAB with Method II is provided below. For this type of analog beamforming, the signals of every $n_{rfa,v}$ consecutive antennas per column and every $n_{rfa,h}$ antennas per row are different phase shifted versions of the signal from a single RF chain, i.e., the 2D antenna virtualization, which means $N_{RF}n_{rfa,h}n_{rfa,v} = N_t$, $n_v^{sp} = n_v/n_{rfa,v}$, and $n_h^{sp} = n_h/n_{rfa,h}$ are two integers. For transmitting the downlink CSI-RS, one embodiment of the analog precoding matrix $W_{dl,rs}^{RF}$ for CSI-RS is chosen such that only one of every $n_{rfa,h}$ consecutive antennas in the first row of the antenna array is connected to a RF chain. Moreover, one of every $n_{rfa,v}$ consecutive antennas in the first column of the antenna array is connected to a RF chain. The choice of antennas can also be any other row and column or multiple rows and multiple columns if the number of total number of connected antennas is smaller than $N_{RF}$. The space of the selected $n_h^{sp}$ antennas can be non-uniform and the intervals of the selected antennas relative to the first antenna is $d_h^{sp}(i)$, $i=0, \ldots, n_h^{sp}-1$, in terms of wavelength. The space of the selected $n_v^{sp}$ antennas can be non-uniform and the intervals of the selected antennas relative to the first antenna is $d_v^{sp}(i)$, $i=0, \ldots, n_v^{sp}-1$, in terms of wavelength. Hence, only the selected $n_v^{sp}+n_h^{sp}$ antennas need to transmit CSI-RS, where the pilot signals of the $n_h^{sp}$ antennas in the first row are used to estimate the channel on the horizontal dimension while the pilot signals of $n_v^{sp}$ antennas of the first column are used to estimate the channel on the vertical dimension. For the kth UE, let the $n_h^{sp} \times 1$ vectors $\hat{h}_k^{hor}(i)$ and $n_v^{sp} \times 1$ vectors $\hat{h}_k^{ver}(i)$, $i=1, \ldots, n_{rs}$, denote the two sets of estimated channel vectors on the pilot subcarriers in the horizontal and vertical dimensions respectively, where $n_{rs}$ is the number of subcarriers for pilot signals. Then, the first principal steering vector to represent the channel of the kth user in the horizontal dimension is estimated by (1.8) and (1.9) as $\hat{e}_k^{hor}(\bar{\theta}_k^{hor})$, where the steering vector in (1.8) is replaced by $$e_{n_h}^{sp}(\theta) = [1 \ e^{j2\pi d_h^{sp}(1)\theta} \ldots e^{j2\pi d_h^{sp}(n_h^{sp}-1)\theta}]^T. \quad (1.23)$$

Similarly, the first principal steering vector to represent the channel of the kth user in the vertical dimension is estimated by (1.11) and (1.12) as $\hat{e}_k^{ver}(\bar{\theta}_k^{ver})$, where the steering vector in (1.11) is replaced by $$e_{n_v}^{sp}(\theta) = [1 \ e^{j2\pi d_v^{sp}(1)\theta} \ldots e^{j2\pi d_v^{sp}(n_v^{sp}-1)\theta}]^T. \quad (1.24)$$

Next, an $n_h^{sp} \times n_h$ matrix $U_k^{hor}$ is constructed with $\hat{\theta}_k^{hor}$ as $$U_k^{hor} = \left\{ e_{n_h^{sp}}^{sp}(\theta_k^l) \middle| \theta_k^l = \hat{\theta}_k^{hor} + \frac{2l}{n_h}, \theta_k^l \in [-1, 1), l \in \mathbb{Z} \right\}, \quad (1.38)$$

which is used to search the other directions of the channel vector in the horizontal direction. Let $Q_k^{hor} = U_k^{hor,H}\hat{R}_k^{hor}U_k^{hor}$ and $d^{hor}$ be the vector consisted of the diagonal elements of $Q_k^{hor}$, where each element of $d^{hor}$ corresponds to a different column steering vector in $U_k^{hor}$, then a vector $\hat{\theta}^{hor}$ is constructed by the $d^{hor}$ angles contained in the column vectors of $U_k^{hor}$ corresponding to the $d^{hor}$ largest values in $d^{hor}$. Next, a vector over is constructed similarly to the process of constructing $\hat{\theta}^{hor}$. Then, the elements in $\hat{\theta}^{hor}$ and $\hat{\theta}^{ver}$ are quantized and fed back to the BS through specific uplink channel by the UE. The BS constructs a matrix $V_k^{hor}$ with the $d^{hor}$ steering vectors based on the $d^{hor}$ angles in $\hat{\theta}^{hor}$ and a matrix $V_k^{ver}$ with the $d^{ver}$ steering vectors based on the $d^{ver}$ angles in $\hat{\theta}^{ver}$. Finally, the subspace of the channel vector of the kth user is constructed as $$V_k = V_k^{ver} \otimes V_k^{hor}. \quad (1.39)$$

Note that if the antenna indexing order in FIG. 5 is changed to be vertical dimension first then the horizontal dimension, then (1.35) is changed to $V_k = V_k^{hor} \otimes V_k^{ver}$.

For the $N_{ue}$ UEs to be scheduled in the next period of time, e.g., one to several OFDM symbols or one to multiple subframes in LTE/LTE-A systems, the BS computes a unique analog precoding/combing matrix. Firstly, the BS computes the covariance matrix for the $N_{ue}$ UEs as $R = \gamma \sum_{k=1}^{N_{ue}} V_k V_k^H$, where $\gamma$ is a scaling factor, e.g., $\gamma = 1/N_{ue}$. Then, it constructs the $N_t \times N_{RF}$ matrix Q with the first $N_{RF}$ eigenvectors of R corresponding to the $N_{RF}$ largest eigenvalues. The matrix R can be updated accordingly when the new pilots or RS are transmitted to estimate the subspace $V_k$.

Figure 7:
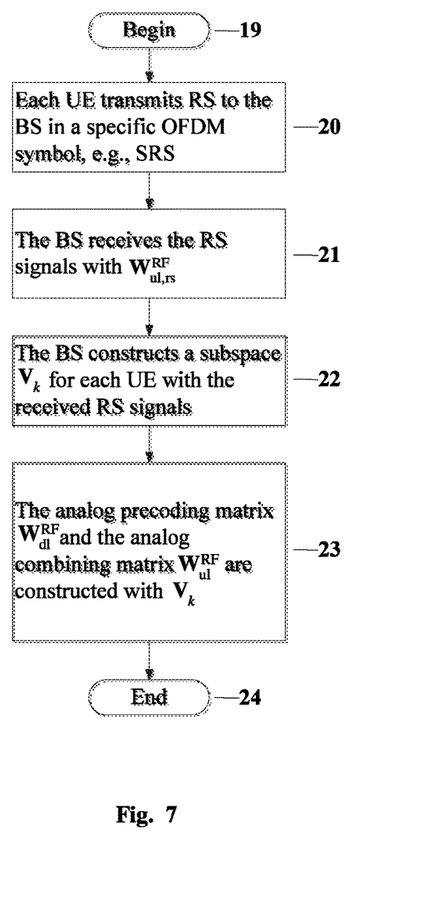
FIG. 7 shows the process of obtaining the analog precoding matrix $W_{dl}^{RF}$ in the downlink and the analog combining matrix $W_{ul}^{RF}$ in the uplink with Method I in the patent.
Figure 8:
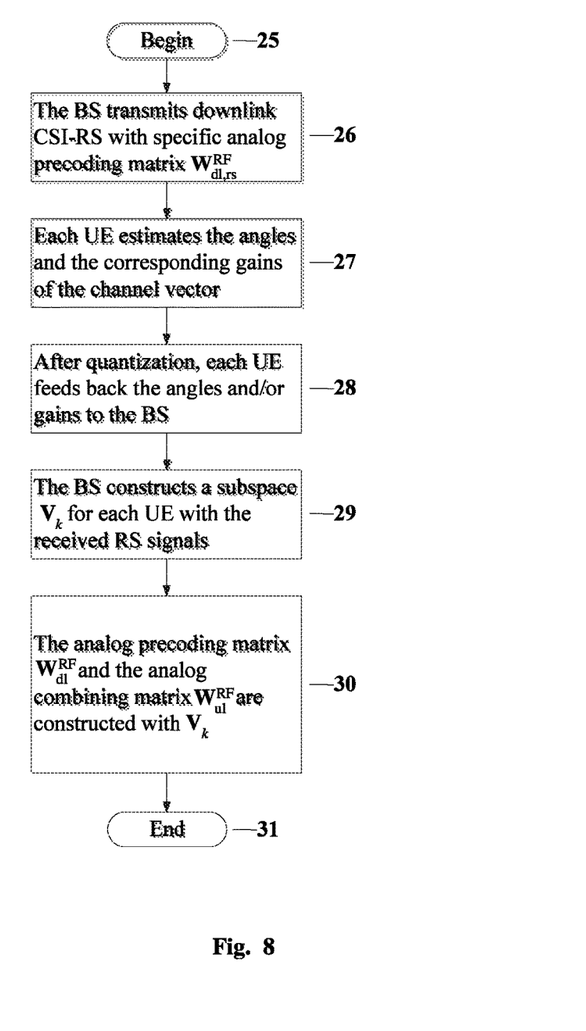
FIG. 8 shows the process of obtaining the analog precoding matrix $W_{dl}^{RF}$ in the downlink and the analog combining matrix $W_{ul}^{RF}$ in the uplink with Method II in the patent.

The process of Method I and Method II to estimate the subspace for a UE is illustrated in FIG. 7 and FIG. 8 respectively. FIG. 7 summarizes the process of obtaining the analog precoding matrix $W_{dl}^{RF}$ in the downlink and the analog combining matrix $W_{ul}^{RF}$ in the uplink with Method I in the patent. Specifically, after the process begins 19, each UE transmits RS to the BS in a specific OFDM symbol, e.g., SRS 20. Then, the BS receives the RS signals with $W_{ul}^{RF}$, 21. Next, the BS constructs a subspace $V_k$ for each UE with the received RS signals 22. Finally, the analog beamforming matrix $W_{dl}^{RF}$ and the analog combing matrix $W_{ul}^{RF}$ are constructed with $V_k$ 23, before the process ends 24. FIG. 8 summarizes the process of obtaining the analog precoding matrix $W_{dl}^{RF}$ in the downlink and the analog combining matrix $W_{ul}^{RF}$ in the uplink with Method II in the patent. Specifically, after the process begins 25, the BS transmits downlink CSI-RS with specific analog beamforming matrix $W_{dl}^{RF}$ 26. Then, each UE estimates the angles and the corresponding gains of the channel vector 27. After quantization, each UE feeds back the angles and/or gains to the BS 28. Next, the BS constructs a subspace $V_k$ for each UE with the received RS signals 29. Finally, the analog beamforming matrix $W_{dl}^{RF}$ and the analog combing matrix $W_{ul}^{RF}$ are constructed with $V_k$ 30, before the process ends 31.

For the GAB, the analog precoding matrix in the downlink for the embodiments in [0030] and [0036] is $W_{ul}^{RF}=\exp[jArg(Q)]$, where Arg(Q) denotes the phase of each element of Q and exp [•] denotes the exponential function of each element of the input matrix. One embodiment of the analog combining matrix in the uplink is $W_{ul}^{RF}=W_{dl}^{RF,T}$.

For the PAB, the analog precoding matrix in the downlink for the embodiments in [0033] and [0037] where $n_{rfa}$ consecutive antennas per row are connected to a single RF chain, i.e., $n_h^{sp}=n_h/n_{rfa}$ is an integer, is $W_{dl}^{RF}=\exp[jArg(Q \circ P)]$, where P is defined as $$P = \begin{bmatrix} 1 & & \\ & \ddots & \\ & & 1 \end{bmatrix}$$

with 1 being the $n_{rfa} \times 1$ vector with all 1 and ∘ denotes the Hadamard product of two matrices. One embodiment of the analog combining matrix in the uplink is $W_{ul}^{RF}=W_{dl}^{RF,T}$.

For the PAB, the analog precoding matrix in the downlink for the embodiments in [0031] and [0038] where $n_{rfa}$ consecutive antennas per column are connected to a single RF chain, i.e., $n_v^{sp}=n_v/n_{rfa}$ is an integer, is $W_{dl}^{RF}=\exp[jArg(Q \circ P)]$, where P is defined as $$P = \begin{bmatrix} T & & \\ & \ddots & \\ & & T \end{bmatrix}$$

with T being the $n_h n_{rfa} \times n_h$ matrix defined as $T=[I_{n_h} \ldots I_{n_h}]$. One embodiment of the analog combining matrix in the uplink is $W_{ul}^{RF}=W_{dl}^{RF,T}$.

For the PAB, the analog precoding matrix in the downlink for the embodiments in [0034] and [0039], where $n_{rfa,v}$ consecutive antennas per column are connected to a single RF chain, i.e., $n_v^{sp}=n_v/n_{rfa,v}$ is an integer, and $n_{rfa,h}$ consecutive antennas per row are connected to a single RF chain, i.e., $n_h^{sp}=n_h/n_{rfa,h}$ is an integer, is $W_{dl}^{RF}=\exp[jArg(Q \circ P)]$, where P is an indication matrix. In the matrix P, all the elements of the nth column, $n=1, \ldots, N_{RF}$, are 0 except that those corresponding to the antennas connected to the nth RF chain are 1. One embodiment of the analog combining matrix in the uplink is $W_{ul}^{RF}=W_{dl}^{RF,T}$.

For the cross-polarized antenna array as in FIG. 6, the methods described in [0029] to [0045] can be applied to the sub-array with single array to obtain the analog precoding matrix as $W_{dl,sp}^{RF}$, then the final analog precoding matrix is $W_{dl}^{RF}=v_{cp} \otimes W_{dl,sp}^{RF}$ or $W_{dl}^{RF}=W_{dl,sp}^{RF} \otimes v_{cp}$ depending on the indexing method of the antenna array, where $v_{cp}=[1\ e^{j\alpha}]$ is the cross-polarized vector depending on the polarization angles, e.g., $v_{cp}=[1\ -1]$ for $\pm\pi/4$ cross polarization. One embodiment of the analog combining matrix in the uplink is $W_{ul}^{RF}=W_{dl}^{RF,T}$.

After $W_{dl}^{RF}$ is determined, for FDD or TDD systems, one embodiment is that CSI-RSs are transmitted with analog precoding matrix $W_{dl}^{RF}$ by the BS. The kth UE estimates the $1 \times N_{RF}$ channel vector seen from the baseband as $h_k^{BB}=h_k W_{dl}^{RF}$, $k=1, \ldots, N_{ue}$. Then, after being quantized, $h_k^{BB}$ is fed back to the BS as $\hat{h}_k^{BB}$. For a specific MU-MIMO group, the indices of the UEs in this specific group are $i_1, \ldots, i_k$, then the effective baseband channel matrix is $\hat{H}^{BB}=[\hat{h}_{i_1}^{BB,T} \ldots \hat{h}_{i_k}^{BB,T}]^T$. With the linear precoding method, e.g., ZF, the precoding matrix at the baseband is $W^{BB}=\gamma \hat{H}^{BB,H}(\hat{H}^{BB}\hat{H}^{BB,H})^{-1}$.

Figure 9:
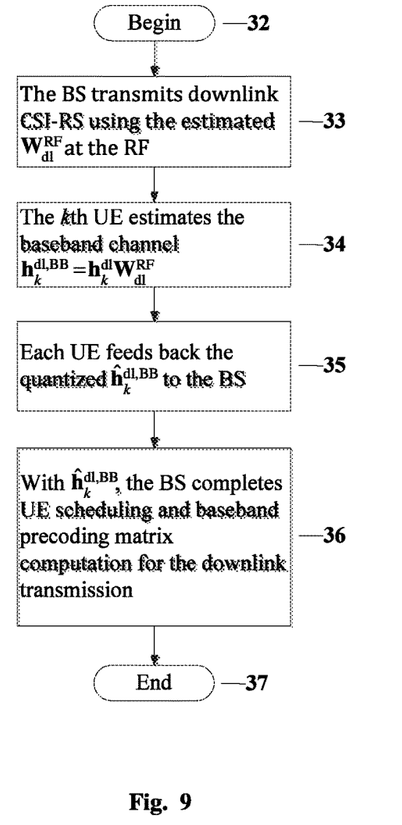
FIG. 9 shows the process of applying $W_{dl}^{RF}$ to estimate the downlink baseband effective channel for the kth UE.

FIG. 9 summarizes the process of applying $W_{dl}^{RF}$ to estimate the downlink baseband effective channel for the kth UE. Specifically, after the process begins 32, the BS transmits downlink CSI-RS using the estimated $W_{dl}^{RF}$ at the RF 33. Then, the kth UE estimates the baseband channel $h_k^{dl,BB}=h_k^{dl} W_{dl}^{RF}$ 34. Next, each UE feeds back the quantized $\hat{h}_k^{dl,BB}$ to the BS 35. Finally, with $\hat{h}_k^{dl,BB}$, the BS completes UE scheduling and baseband precoding matrix computation for the downlink transmission 36, before the process ends 37.

Figure 10:
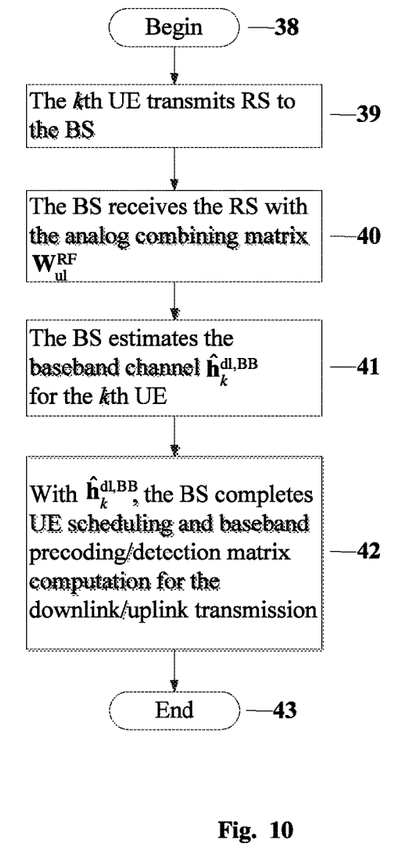
FIG. 10 shows the process of applying $W_{ul}^{RF}$ to estimate the uplink baseband effective channel for the kth UE.

After $W_{dl}^{RF}$ is determined, for TDD systems, one embodiment is that each UE transmits RSs to the BS on the specific uplink channel, e.g., SRS channel. The BS receives the RSs with the analog combining matrix $W_{ul}^{RF}=W_{dl}^{RF}$. As a result, the $N_{RF} \times 1$ channel vector of the kth UE is estimated at the baseband as $\bar{h}_k^{BB}=h_k^{ul} W_{ul}^{RF}$. Due to the reciprocity property of the channel vector, the channel vector in the downlink is estimated as $\hat{h}_k^{BB,dl}=\hat{h}_k^{BB,ul,T}$. For a specific MU-MIMO group in the downlink, the indices of the grouped UEs are $i_1, \ldots, i_k$, then the effective baseband channel matrix is $\hat{H}^{BB,dl}=[\hat{h}_{i_1}^{BB,dl,T} \ldots \hat{h}_{i_k}^{BB,dl,T}]^T$. With the linear precoding method, e.g., ZF, the precoding matrix at the baseband is $W^{BB}=\gamma \hat{H}^{BB,dl,H}(\hat{H}^{BB,dl}\hat{H}^{BB,dl,H})^{-1}$. FIG. 10 summarizes the process of applying $W_{ul}^{RF}$ to estimate the uplink baseband effective channel for the kth UE. Specifically, after the process begins 38, the kth UE transmits RS to the BS 39. Then, the BS receives the RS with the analog combining matrix $W_{ul}^{RF}$ 40. Next, the BS estimates the baseband channel $\hat{h}_k^{dl,BB}$ for the kth UE 41. Finally, with $\hat{h}_k^{dl,BB}$, the BS completes UE scheduling and baseband precoding/detection matrix computation for the downlink/uplink transmission 42, before the process ends 43.

After $W_{ul}^{RF}$ is determined, for FDD or TDD systems, one embodiment is that each UE transmits RSs to the BS on the specific uplink channel, e.g., SRS channel. The BS receives the RSs with analog combining matrix $W_{ul}^{RF}$. As a result, the $N_{RF} \times 1$ channel vector of the kth UE is estimated at the baseband as $\hat{h}_k^{BB,ul}=h_k^{ul}W_{ul}^{RF}$. For a specific MU-MIMO group in the uplink, the indices of the grouped UEs are $i_1, \ldots, i_k$, then the effective baseband channel matrix is $\hat{H}^{BB,ul}=[\hat{h}_{i_1}^{BB,ul} \ldots \hat{h}_{i_k}^{BB,ul}]$. With the linear detection method, e.g., ZF, the detection matrix at the baseband is $G^{BB}=(\hat{H}^{BB,ul,H}\hat{H}^{BB,ul})^{-1}\hat{H}^{BB,ul,H}$.

After $W_{ul}^{RF}$ is determined, for FDD or TDD systems uplink data transmission, one embodiment is that the pilots are inserted in the data transmission area of the time-frequency resource. The BS receives the signals with analog combining matrix $W_{ul}^{RF}$. With the received pilot signals at the baseband, as a result, the $N_{RF} \times 1$ channel vector of the kth UE is estimated at the baseband as $\hat{h}_k^{BB,ul}=h_k^{ul}W_{ul}^{RF}$. For a specific MU-MIMO group in the uplink, the indices of the grouped UEs are $i_1, \ldots, i_k$, then the effective baseband channel matrix is $\hat{H}^{BB,ul}=[\hat{h}_{i_1}^{BB,ul} \ldots \hat{h}_{i_k}^{BB,ul}]$. With the linear detection method, e.g., ZF, the detection matrix at the baseband is $G^{BB}=(\hat{H}^{BB,ul,H}\hat{H}^{BB,ul})^{-1}\hat{H}^{BB,ul,H}$.

Although the foregoing descriptions of the preferred embodiments of the present inventions have shown, described, or illustrated the fundamental novel features or principles of the inventions, it is understood that various omissions, substitutions, and changes in the form of the detail of the methods, elements or apparatuses as illustrated, as well as the uses thereof, may be made by those skilled in the art without departing from the spirit of the present inventions. Hence, the scope of the present inventions should not be limited to the foregoing descriptions. Rather, the principles of the inventions may be applied to a wide range of methods, systems, and apparatuses, to achieve the advantages described herein and to achieve other advantages or to satisfy other objectives as well.

What we claim are:

1. A MU-MIMO TDD wireless communication system comprising a BS with plural of antennas where the number of RF chains is smaller than the number of antennas; the BS acquiring CSI by each UE transmitting uplink pilot; the BS computing a first level unified analog beamforming matrix for RF processing; and the BS computing a second level matrix for baseband processing;
wherein the system further comprises the BS applying the first level matrix and second level matrix simultaneously to transmit signals in the downlink or receive signals in the uplink,
wherein the coupling between the selected receiving antennas and the RF chains is represented by a coupling matrix, whose elements are binary with one value denoting a specific pair of a RF chain and antenna is connected while another value denoting disconnection:
wherein the BS constructs $n_h$ mutual orthogonal vectors and the associated gains $g_k^h = [g_1^h, \ldots, d_{n_h}^h]$ for the kth UE to represent the channel information along the horizontal dimension and $n_v$ mutual orthogonal vectors and the associated gains $g_k^v = [g_1^v, \ldots, g_{n_v}^v]$ to represent the channel information along the vertical dimension respectively with the estimated channel coefficients for each UE when the antennas at the BS are placed as a planar array; and
wherein the vector along the horizontal and vertical dimensions for the kth UE is represented by $e_k^h(\phi_i) = [1 \ldots e^{j(n_h-1)\phi_i}]^T$, $i=1, \ldots, n_h$, where $n_h$ is the number of antennas in the horizontal dimension and $e_k^v(\theta_i) = [1 \ldots e^{j(n_v-1)\theta_i}]^T$, $i=1, \ldots, n_v$, where $n_v$ is the number of antennas in the vertical dimension.

2. The system in claim 1 further comprising that the first level matrix is used to couple the RF chains and the physical antennas of the BS.

3. The system in claim 1 further comprising that the second level matrix is used to couple the output of the modulation module and the RF chains of the BS.

4. The system in claim 1 further comprising the UEs served by the BS transmitting pilot signal or reference signal information in the uplink channel for BS CSI acquisition to compute the first level matrix, and the BS sampling the received signals along the antenna dimension so that the number of signals passed to the RF chain is no larger than the number of RF chains $N_{RF}$.

5. The system in claim 4 further comprising that the sampling is implemented by selecting the signals from part of the receiving antennas when the antennas at the BS are placed as a linear array.

6. The system in claim 4 further comprising that the sampling is implemented by selecting the signals from one row of the receiving antennas in the horizontal dimension and one column of the receiving antennas in vertical dimension respectively when the antennas at the BS are placed as a planar array.

7. The system in claim 4 further comprising that the sampling is implemented by selecting the signals from part of one row of the receiving antennas in the horizontal dimension and part of one column of the receiving antennas in vertical dimension respectively when the antennas at the BS are placed as a planar array.

8. The system in claim 4 further comprising that the sampling is implemented by selecting the signals from one row of the receiving antennas in the horizontal dimension and part of one column of the receiving antennas in vertical dimension respectively or selecting the signals from part of one row of the receiving antennas in the horizontal dimension and one column of the receiving antennas in vertical dimension respectively when the antennas at the BS are placed as a planar array.

9. The system in claim 4 further comprising that the selected pilot signals are passed to the baseband to estimate the channel coefficients between each UE and the selected receiving antennas at the BS.

10. The system in claim 1 further comprising that the BS constructs $n_h$ mutual orthogonal vectors to represent the channel information along the horizontal dimension with the estimated channel coefficients for each UE when the antennas at the BS are placed as a linear array.

11. The system in claim 1 further comprising that the channel of a UE is represented by $e_k^h(\phi_i)$, $e_k^v(\theta_i)$, $g_k^h$ and $g_k^v$ as $R_k = V_k^v \otimes V_k^h$ or $R_k = V_k^h \otimes V_k^v$ depending on the indexing of the antenna array, where the matrices $V_k^h$ and $V_k^v$ are $V_k^h = U_k^h \text{diag}(g_k^h)$ and $V_k^v = U_k^v \text{diag}(g_k^v)$ with $U_k^h = [e_k^h(\phi_1) \ldots e_k^h(\phi_{n_h})]$, $U_k^v = [e_k^v(\theta_1) \ldots e_k^v(\theta_{n_v})]$ and $\text{diag}(a)$ generating a diagonal matrix with a being its diagonal elements.

12. The system in claim 1 further comprising the BS computing the first level matrix for the following time slots with $R_k$, $k \in \Phi$, where $\Phi$ is the set containing the UEs scheduled in the following time slots.

13. The system in claim 12 further comprising the BS computing the eigenvectors of the matrix R defined as $R = \sum_{k \in \Phi} \beta_k R_k$, where $\beta_k$ is a weighting factor depending on the proportion of the allocated time-frequency resource to the kth UE and constructing an $N_t \times N_{RF}$ matrix $V^{RF}$ with the first $N_{RF}$ eigenvectors corresponding to the first $N_{RF}$ largest eigenvalues.

14. The system in claim 1 further comprising the BS computing the first level matrix as $W^{RF} = \exp[j\arg(V^{RF})]$.

15. The system in claim 1 further comprising the first level unified analog beamforming matrix being applied to both Line of Sight (LoS) and Non-Line of Sight (NLoS) channel conditions.

16. The system in claim 1 further comprising a BS computing the second level matrix with the estimated channel coefficients seen from the baseband for each MU-MIMO group on each time-frequency resource unit.

17. The system in claim 1 further comprising that the pilot signal(s) for computing the first level matrix is transmitted periodically or when requested by the BS, which is determined by the BS and informed to the UEs through a downlink control message.

18. A system for MU-MIMO TDD wireless communication comprising a BS with plural of antennas where the number of RF chains is smaller than the number of antennas, a BS acquiring CSI by a BS transmitting downlink measurement pilot or reference signals and the UE feeding back the quantized measured CSI, a BS computing a first level matrix for RF processing using the quantized measured CSI, and a BS computing a second level matrix for baseband processing;
  wherein the BS applies the first level matrix and second level matrix simultaneously to transmit signals in the downlink or receive signals in the uplink;
  wherein the BS computes the first level matrix for the following time slots with $R_k$, $k \in \Phi$, where $\Phi$ is the set containing the UEs scheduled in the following time slots; and
  wherein the BS computes the eigenvectors of the matrix R defined as $R = \Sigma_{k \in \Phi} \beta_k R_k$, where $\beta_k$ is a weighting factor depending on the proportion of the allocated time-frequency resource to the kth UE and constructing an $N_t \times N_{RF}$ matrix $V^{RF}$ with the first $N_{RF}$ eigenvectors corresponding to the first $N_{RF}$ largest eigenvalues; and where $R_k = V_k^v \otimes V_k^h$ or $R_k = V_k^h \otimes V_k^v$ depending on the indexing of the antenna array, where the matrices $V_k^h$ and $V_k^v$ are $V_k^h = U_k^h \text{diag}(g_k^h)$ and $V_k^v = U_k^v \text{diag}(g_k^v)$ with $U_k^h = [e_k^h(\phi_1) \ldots e_k^h(\phi_{n_h})]$, $U_k^v = [e_k^v(\theta_1) \ldots e_k^v(\theta_{n_v})]$ and $\text{diag}(a)$ generating a diagonal matrix with a being its diagonal elements.

19. The system in claim 18 further comprising the BS transmitting pilots or references from part of the transmitting antennas in the downlink for UEs to obtain channel related information.

20. The system in claim 18 further comprising the BS selecting $N_{RF}$ antennas to transmitting reference signals in the specified time slots through frequency division multiplexing (FDM) or time division multiplexing (TDM) or code division multiplexing (CDM) or any combinations of these three multiplexing methods.

21. The system in claim 20 further comprising the BS selecting continuous $N_{RF}^h$ antennas to transmit reference signals when the $N_t$ antennas are placed as linear array, where $N_{RF}^h \leq N_{RF}$.

22. The system in claim 20 further comprising the BS selecting $N_{RF}^h$ antennas in a row and $N_{RF}^v$ antennas in a column to transmitting reference signals when the $N_t$ antennas are placed as a planar array, where $N_{RF}^h + N_{RF}^v \leq N_{RF}$.

23. The system in claim 18 further comprising the coupling between the selected transmitting antennas and the RF chains is represented by a coupling matrix, whose elements are binary with one value denoting a specific pair of a RF chain and antenna is connected while another value denoting disconnection.

24. The system in claim 18 further comprising a UE estimating the channel coefficients in the specified bandwidth between each pair of a selected BS transmitting antenna and a receiving antenna and analyzing the principle components of the channel matrix between the BS and itself.

25. The system in claim 24 further comprising the UE estimating $n_h$ angles $\phi_1, \ldots, \phi_{n_h}$ and the corresponding gains $g_1^h, \ldots, g_{n_h}^h$ when the BS antennas are placed as a linear array.

26. The system in claim 24 further comprising the UE estimating $n_h$ angles $\phi_1, \ldots, \phi_{n_h}$ and the corresponding gains $g_1^h, \ldots, g_{n_h}^h$ for the horizontal dimension as well as $\theta_1, \ldots, \theta_{n_v}$ and the corresponding gains $g_1^v, \ldots, g_{n_v}^v$ for the vertical dimension when the BS antennas are placed as a planar array.

27. The system in claim 18 further comprising that the $n_h$ gains in the horizontal dimension can be normalized by one of them and the rest $n_h - 1$ values after normalization are fed back to the BS through uplink control channel by the UE when the antennas at the BS are placed as a linear array.

28. The system in claim 18 further comprising that the $n_h$ gains in the horizontal dimension can be normalized by one of them and the rest $n_h - 1$ values after normalization are fed back to the BS through uplink control channel by the UE and the $n_v$ gains in the vertical dimension can be normalized by one of them and the rest $n_v - 1$ values after normalization are fed back to the BS through uplink control channel by the UE when the antennas are placed as a planar array.

29. The system in claim 18 further comprising the BS computing the first level matrix as $W^{RF} = \exp[j \arg(V^{RF})]$.

30. The system in claim 18 further comprising two or more MU-MIMO groups that are scheduled and multiplexed in different frequency resources using the same first level matrix for RF processing.

31. The system in claim 18 further comprising the first level matrix being applied to both Line of Sight (LoS) and Non-Line of Sight (NLoS) channel conditions.

32. The system in claim 18 further comprising the BS estimating the channel coefficients of each UE seen from the baseband by having a UE transmitting pilot signal(s) or reference signal(s) in the uplink and the BS applying the first level matrix $W^{RF}$ to couple the physical receiving antennas and the RF chains.

33. The system in claim 18 further comprising the BS obtaining the channel coefficients of each UE seen from the baseband by having the BS transmitting pilot signal(s) or reference signal(s) in the downlink with the first level matrix $W^{RF}$ being applied to couple the physical transmitting antennas and the RF chains and the UE feeds back the quantized channel coefficients estimated from the received reference signals.

34. The system in claim 18 further comprising the BS computing the second level matrix with the estimated channel coefficients seen from the baseband for each MU-MIMO group on each time-frequency resource unit.

35. The system in claim 18 further comprising that the pilot for computing the first level matrix is transmitted periodically or when requested by the BS, which is determined by the BS and informed to the UEs through a downlink control message.

36. A system for MU-MIMO TDD wireless communication comprising a BS with plural of antennas where the number of RF chains is smaller than the number of antennas, a BS acquiring CSI by a BS transmitting downlink measurement pilot or reference signals and the UE feeding back the quantized measured CSI, a BS computing a first level matrix for RF processing using the quantized measured CSI, and a BS computing a second level matrix for baseband processing;
  wherein the system further comprises the BS constructing a matrix to represent the CSI related information between all the transmitting antennas and a UE with the feedback angles and corresponding gains by the UE;
  wherein $n_h$ vectors are constructed by $e_k^h(\phi_i) = [1 \ldots e^{j(n_h-1)\phi_i}]^T$, $i = 1, \ldots, n_h$ for the kth UE, where $n_h$ is the number of antennas equipped in the horizontal dimension when the antennas at the BS are placed as a linear array.

37. The system in claim 36 further comprising that $n_h$ vectors are constructed by $e_h^k(\phi_i) = [1 \ldots e^{j(n_h-1)\phi_i}]^T$, $i = 1, \ldots, n_h$ for the kth UE, where $n_h$ is the number of antennas equipped in the horizontal dimension, and $n_v$ vectors are constructed by $e_k^v(\theta_i) = [1 \ldots e^{j(n_v-1)\theta_i}]^T$, $i = 1, \ldots, n_v$ for the kth UE if planar antenna array is employed, where $n_v$ is the number of antennas equipped in the vertical dimension when the antennas at the BS are placed as a planar array.

38. The system in claim 36 further comprising that the channel of the kth UE is represented by a matrix $R_k = V_k^h$ if linear antenna array is employed at the BS, where $V_k^h = U_k^h \text{diag}(g_1^h, \ldots, g_{n_h}^h)$ with $U_k^h = [e_k^h(\phi_{n_h})]$ and diag(a) generating a diagonal matrix with vector a being its diagonal elements.

39. The system in claim 36 further comprising that the channel of the kth UE is represented by a matrix $R_k = V_k^v \otimes V_k^h$ or $R_k = V_k^h \otimes V_k^v$ depending on the indexing of the antenna array if planar array is employed at the BS, where $V_k^h = U_k^h \text{diag}(g_1^h, \ldots, g_{n_h}^h)$ with $U_k^h = [e_k^h(1) \ldots e_k^h(\phi_{n_h})]$, $V_k^v = U_k^v \text{diag}(g_1^v, \ldots, g_{n_v}^v)$ with $U_k^v = [e_k^v(\theta_1) \ldots e_k^v(\theta_{n_v})]$ and diag(a) generating a diagonal matrix with vector a being its diagonal elements.

* * * * *